United States Patent [19]

Liston

[11] Patent Number: 5,593,234
[45] Date of Patent: Jan. 14, 1997

[54] BEARING ASSEMBLY WITH POLYCRYSTALLINE SUPERLATTICE COATING

[75] Inventor: Mary-Jo A. Liston, Whitmore Lake, Mich.

[73] Assignee: NTN Corporation, Osaka, Japan

[21] Appl. No.: 442,301

[22] Filed: May 16, 1995

[51] Int. Cl.$^6$ .................................................. F16C 33/32
[52] U.S. Cl. ........................... 384/492; 384/297; 384/565; 384/569; 384/907; 384/912; 384/913; 428/216; 428/336; 428/469; 428/408; 428/698; 428/701; 428/702; 428/704
[58] Field of Search .................................... 428/698, 469, 428/336, 216, 701, 702, 704, 408; 384/492, 297, 565, 569, 907, 912, 913

[56] References Cited

U.S. PATENT DOCUMENTS

| | | | |
|---|---|---|---|
| 4,828,728 | 5/1989 | Dimigen et al. | 252/12 |
| 4,835,062 | 5/1989 | Holleck | 428/469 |
| 4,960,643 | 10/1990 | Lemelson | 428/408 |
| 5,067,826 | 11/1991 | Lemelson | 384/492 |
| 5,284,394 | 2/1994 | Lemelson | 384/492 |

OTHER PUBLICATIONS

Thom, Robert et al., Rolling Contact Fatigue Tests of Reactively Sputtered Nitride Coatings of Ti, Zr, Hf, Cr, Mo, Ti–Zr and Ti–Al–V on 440C Stainless Steel Substrates, Surface and Coatings Technology, vol. 62, pp. 423–427 (1993).

Sproul, William D. et al., Reactive Unbalanced Magnetron Sputterng of the Nitrides of Ti, Zr, Hf, Cr, Mo, Ti–Al, Ti–Zr, and Ti–Al–V, Surface and Coatings Technology, vol. 61, pp. 139–143 (1993).

Chu, X. et al., Mechanical Properties and Microstructures of Polycrystalline Ceramic/Metal Superlattices: TiN/Ni and TiN/No$_{0.9}$Cr$_{0.1}$, Surface and Coatings Technology, vol. 61, pp. 251–256 (1993).

Chu, X. et al. Deposition and Properties of Polycrystalline TiN/NbN Superlattice Coatings, J. Vac. Sci. Technol. A 10(4), p. 1604, Ju.l/Aug. 1992.

Copending U.S. Patent Application Ser. No. 07/973,390, Filed: Nov. 9, 1992, Title: Polycrystalline Superlattice Coated Substrate and Method/Apparatus for Making Same, Applicant: Scott A. Barnett et al.

Chu, X. et al., "Reactive unbalanced magnetron sputter deposition of polycrystalline TiN/NbN superlattice coatings," *Surface and Coatings Technology*, vol. 57, pp. 13–18 (1993).

Sproul, William D. et al., "Multi–Layer, Multi–Component, and Multi–Phase PVD Coatings for Enhanced Performance," *Abstract number: 44, Invited Paper*, to be presented at the American Vacuum Society's 40th National Symposium, Orlando, Florida, Nov. 17, 1993 and to be submitted for publication in the Journal of Vacuum Science and Technology.

Chang, T. P., "Friction and Wear of Carbon Nitride and Titanium Nitride/Niobium Nitride Superlattice Coatings," *Abstracts of presentations made at the 50th STLE Annual Meeting*, May 14–19, Hyatt Regency Hotel, Chicago, Illinois (1995).

Primary Examiner—Archene Turner
Attorney, Agent, or Firm—Harness, Dickey & Pierce, PLC

[57] ABSTRACT

An improved bearing assembly includes a superhard polycrystalline superlattice coating disposed on one or more surfaces. The coating is formed in layers from materials selected from the group consisting of ceramics, metals, alloys, nitrides, borides, carbides and oxides of transition metals, other metals and alloys, carbon, and combinations thereof. The bearing assembly includes a first race having a first load supporting surface and a second race disposed in a spaced relation with said first race, wherein the second race has a second load supporting surface. The bearing assembly further includes a rolling element assembly disposed in communication with the first race and the second race and sized for rolling movement between the first load supporting surface of the first race and the second load supporting surface of the second race. Preferred selections for the coating material are composite coatings including two or more layers of a titanium nitride/niobium nitride period or a titanium nitride/carbon nitride period in a multiple-period arrangement. The bearing assembly having this coating is operable for enhanced durability.

22 Claims, 3 Drawing Sheets

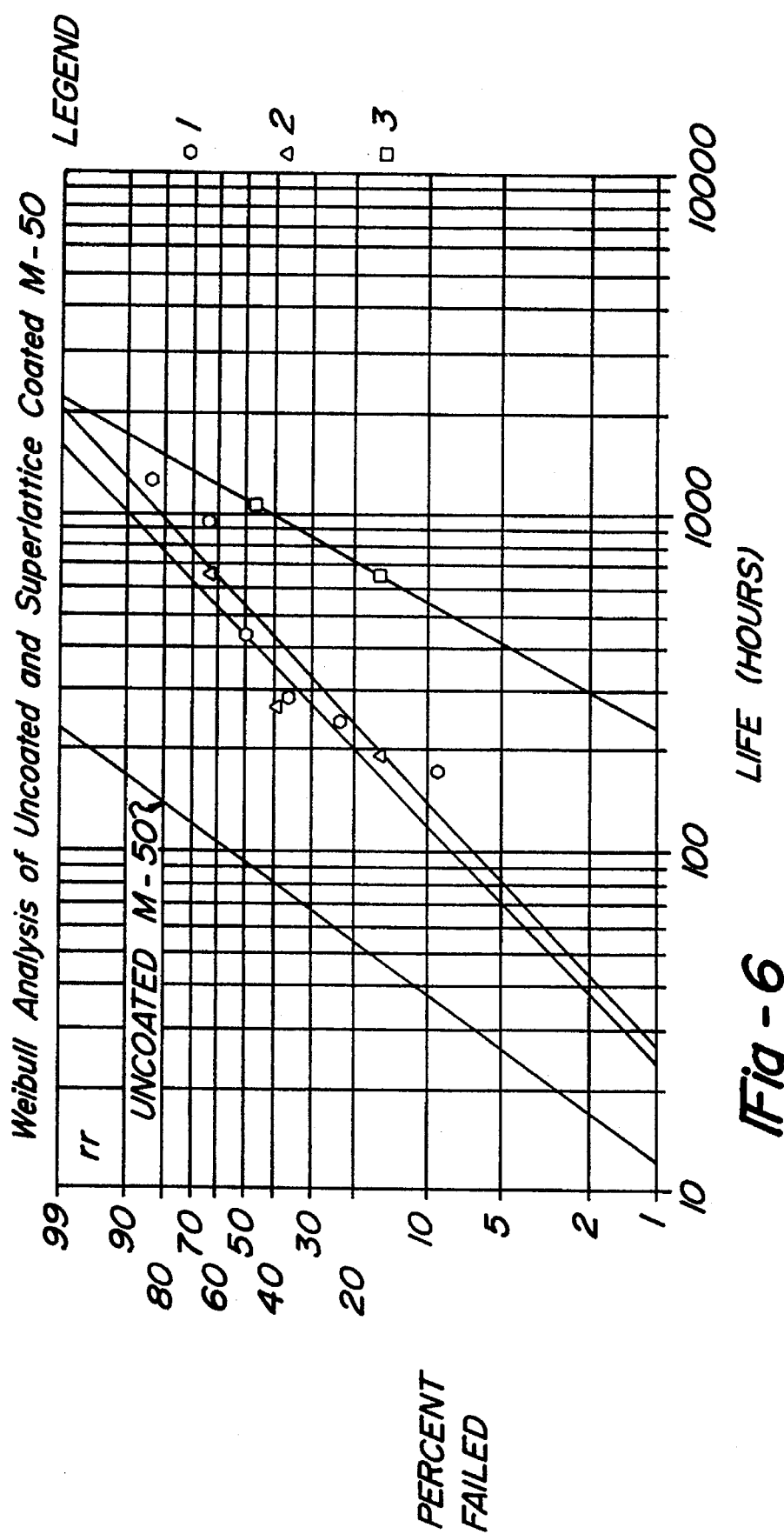

BEARING ASSEMBLY WITH POLYCRYSTALLINE SUPERLATTICE COATING

BACKGROUND OF THE INVENTION

1. Technical Field

The present invention relates generally to rolling element-type bearing assemblies, and particularly relates to bearing assemblies of enhanced performance and durability that are coated upon at least a portion thereof with one or more superhard polycrystalline superlattice surface coating materials.

2. Discussion

Bearings support other parts in a machine which rotate, slide or oscillate in or on them in a reduced friction, or anti-friction, arrangement. Rolling element bearings are of various types including ball bearings, roller bearings and thrust bearings. Ball bearings and roller bearings have spherical and cylindrical roller elements, respectively, disposed between two concentric ring-shaped members, or races. A thrust bearing has a pair of radial surfaces with rolling elements between, facing the two surfaces. In rolling element bearings, a plurality of roller elements, such as spherical roller elements, or balls, are confined between first and second rings, or races. In the case of a bearing which provides restraint of radial loads, the races would define inner and outer races. Free motion is accomplished between the two rings through the rolling of the roller elements against a first load support surface of a first race and a first load support surface of a second race. As such, the roller elements are sized to a rolling diameter suitable for being retained in a rolling relationship between the races. The roller elements may be retained in a spaced arrangement relative to one another through the use of one or more types of support structures, such as a cage.

Alternatively, a bearing assembly may include a plurality of elongated roller elements as well, confined within suitably sized first and second races. This type of arrangement is called a roller bearing assembly. Roller bearing assemblies are made in cylindrical configuration and in a tapered configuration, wherein tapered roller bearings are set within a correspondingly tapered set of races.

One feature that describes a superior bearing assembly is its durability. The durability for a given bearing assembly is described in the art as the rolling contact fatigue (RCF) life for the assembly. Durability of a bearing assembly is often related at least in part to the freedom of motion of the components therein. Improvements in the durability of bearing assemblies are therefore described as improvements in the RCF life. The RCF life of a bearing assembly is dependent at least in part upon several properties of individual components of the assembly, as well as upon the interaction between these individual components. These properties include those associated with the material selections for the individual bearing assembly components, such as hardness and resistance to corrosion and other chemical interaction. These properties, in turn, affect the interactions among components of a bearing assembly, through such measured properties as coefficient of friction. It is thus desirable to improve one or more of these properties, such as increasing hardness, increasing corrosion resistance and decreasing coefficient of friction, in order to improve the RCF life of a bearing assembly.

The materials from which bearing assembly components are constructed have included various metals, metal alloys and ceramic materials. Some examples include alloy steels, stainless steels and silicon nitride. The selection of base material from which bearing assembly components are constructed is important because the life of bearing assemblies is determined in large part by the physical characteristics of each bearing component's base material. For example, ceramics have been shown to exhibit superior resistance to wear as compared to steel when ceramic balls have been paired with steel races in a bearing assembly. The importance of physical characteristics of a particular material selection may relate to its interaction with other materials or its performance alone. For this reason, the selection of bearing component materials necessarily takes into account material properties both on an individual basis and within a multiple-component assembly.

With regard to individual material properties, one way in which bearings are expected to fail is by spalling, typically initiated at a subsurface location at the depth of maximum shear stress. Physical defects in the base material, especially at subsurface locations, can act as stress risers, thereby creating more favorable initiation sites for spalling to occur. Such defects are typically non-metallic inclusions that occur during steel making production.

Improvements in steel making technology over the years has caused vast improvements in the internal cleanliness of the materials from which bearing components are made. Prior to the mid-1960's steels were air-melted. Subsequently introduced vacuum degassing technology reduced the non-metallic inclusions in steel. Since the early 1980's, further improvements in the reduction of non-metallic inclusions were accomplished by the introduction of ladle refining and continuous casting of steels. In particular, ladle refining allowed for the close control of steel composition and oxygen content, while continuous casting reduced inclusions from refractories.

Since the materials from which bearing components are made, such as steels, have become cleaner, the classic failure of subsurface initiated spalling has become less frequent. The initiation of failures has therefore become attributable to surface or near surface physical properties. The hardness of the base material has become an important design consideration toward both the durability and performance of a bearing assembly. Increased hardness at the surface results in lower coefficients of friction during relative movement. Increased hardness can also prevent raceway or rolling element surfaces from becoming dented from debris rolled between contact surfaces. Debris denting can cause stress risers at the surface of a component and can act as an initiation site for failure.

Improvements have been made in the hardness of base materials through the manufacture of ceramics that are typically harder than steel. However, ceramics are often more expensive to manufacture, and have lower fracture toughness and low coefficients of thermal expansion that have to be designed differently for. Therefore, there has been a recent focus on the application of surface coatings to steel bearing components as a method for extending bearing life. Surface coatings have been found to enhance performance and durability of bearing components somewhat by supplementing the base material with a material having superior physical characteristics to those of the base material. The use of surface coatings is therefore, at a minimum, intended to produce a surface that is superior to that of the original base material at the surface level.

The application of coatings to bearing assembly components enhances several physical properties of the base material. These properties include hardness and resistance to corrosion or other undesirable chemical interaction. The hardness of the load supporting surfaces of a bearing assembly, in turn, enhances certain physical characteristics of the surface which become apparent during rolling contact. These characteristics include improved resistance to surface cracking, improved resistance to debris denting and possibly lower coefficient of friction. The resistance to corrosion or chemical interaction is typically the result of the surface coating being non-reactive and acting as a physical barrier between a potentially corrosive environment and the base bearing material.

The mechanisms by which coatings extend the RCF life of bearings are not completely understood. Recent studies have, however, recognized some reasons for the advantages realized by their use. Some coatings impart a compressive residual stress on the base material. Imparting a compressive stress thereby potentially enhances the life of the bearing. When a bearing is rolling contact fatigued, the surface of the bearing is subjected to cyclical compressive and tensile stresses. If a large residual compressive stress is present on the surface of the bearing, the tensile stress must be sufficiently large to overcome the surface compressive stress before the bearing experiences the detrimental effects of the tensile stress. Compressive stresses from coatings can thus postpone the onset of surface cracks.

The adhesion of a coating onto the surface of a bearing is also very important toward its effect on the above properties and characteristics. Many coatings that have been developed do not remain adhered to a surface when subjected to rolling contact stresses. The manner in which such coatings become removed typically involves a dusting or flaking of coating particles from the bearing surface. These particles can become lodged in or can repeatedly pass through multiple contact areas, causing resistance in operation. This resistance is exhibited as excessive noise and vibration. Resistance is detrimental to performance of a bearing assembly because it restricts freedom of motion. Resistance is detrimental to durability of a bearing assembly because it can cause premature failure through damage such as surface cracking or debris denting. In some situations, such as bearings used in the operation of silicon wafer processing equipment, it is also desirable to minimize dust or flakes, which could violate cleanliness requirements of the operations. Therefore, it is important that a coating exhibit adequate adhesion. However, it should be realized that not all well-adhered coatings enhance the RCF life of a bearing assembly. Poorly adhered coatings flake off from the base material soon during testing. The coatings of the present invention, however, are intended to have a much longer wear life.

Bearings often operate in applications having minimal lubrication. Such applications include locations that are starved of oil or other lubricant during start up, and conditions where a minimal lubricant film is available throughout operation. In both cases, asperity contact between the rolling surfaces occurs, which can lead to surface initiated damage and shorter bearing life. Therefore, it is desirable for this additional reason to have a hard load supporting surface for these bearings.

Other advantages realized by bearings having hard surface coatings include the ability to accomplish the same load support using bearings of smaller dimensions. These advantages can result in cost savings during manufacture and size and weight savings, which can affect convenience of operation and the reduction of required physical space.

Prior attempts to construct bearing assemblies with hard surface coatings have included bearings having coatings of synthetic diamond or diamond-like carbon. These coatings are deposited as atoms of carbon derived from molecules of a carbon-containing gas, such as methane. Other bearing assemblies have included various transition metal nitride coatings such as TiN, ZrN, HfN, CrN, $Mo_2N$, $Ti_{0.5}Al_{0.5}N$, $Ti_{0.5}Zr_{0.5}N$ and (Ti—Al—V)N (from the aircraft alloy Ti-6 wt. % Al-4 wt. % V). See, for example, Thom et al., Surface and Coatings Technology, 62, 423–427 (1993) and Sproul et al., Surface and Coatings Technology, 61, 139–143 (1993). Many of these attempts at hard surface coatings have been directed toward reaching the hardness figures for diamond thin films, which range from about 55 GPa to about 110 GPa. The hardnesses of these prior surface coatings have not been satisfactory, however. For example, the hardnesses of diamond-like coatings that have exhibited favorable RCF properties have been about 11–12 GPa.

Research into hard surface coatings has also inquired into how these coatings change the coefficient of friction. The coefficient of friction is most influential toward RCF life when a bearing assembly is operated under non-lubricated conditions. Diamond-like hydrocarbon coatings have been found to substantially lower the coefficient of friction of a bearing steel to about 0.1. For applications where bearings are run in the absence of lubrication, lowering the coefficient of friction to this level or below is desirable.

Therefore, while prior bearings have included hard surface coatings, there is nevertheless a need for improvement in bearings having hard surface coatings. Improvement is needed in terms of hardness, rolling contact fatigue life, coefficient of friction, resistance to chemical interaction and freedom of motion between components, as well as in their ease and cost of manufacture. The need for durability improvements is evidenced by the fatigue and wear still experienced by bearing assembly components from their operation. The need for improvements in coating selection for bearings is evidenced by several deficiencies in the application of prior coatings to bearing assemblies. For example, some coatings cannot be synthesized at or near room temperature. The application of such coatings to bearing assemblies at elevated temperatures can result in alteration of the bearing assembly substrate properties. Additionally, some coatings require expensive or specialized equipment, and/or are difficult to be scaled up for industrial applications.

There are also considerations for bearing assembly coating materials surrounding their construction and thickness. Typically, many industrial equipment surfaces that are coated for enhancing wear and/or performance will include a relatively thicker coating than is desirable in bearing assemblies. Bearings often require thinner surface coatings because thinner coatings stay better adhered under rolling contact conditions. For this and other reasons, the principles of surface coatings for other types of surfaces cannot necessarily be extended to apply directly to bearings. The selection of bearing coating materials therefore requires an analysis of the efficiency of benefits achieved relative to thickness.

The need therefore exists for an improved bearing assembly, in terms of durability and performance, having surfaces of improved hardness, rolling contact fatigue life, coefficient of friction and freedom of motion between components, as well as in their ease and cost of manufacture. The need further exists for bearing assemblies having thin surface coatings that can impart the above advantages. The need further exists for bearing assemblies having the above advantages that are easy and economical to manufacture.

SUMMARY OF THE INVENTION

An object of the present invention is to provide a bearing assembly having at least a portion of its components coated with a superhard polycrystalline superlattice surface coating material.

An object of the present invention is to provide a bearing assembly having a superhard polycrystalline superlattice coating that enhances the mechanical properties of the underlying bearing material.

An object of the present invention is to provide a bearing assembly having increased surface hardness.

Another object of the present invention is to provide a bearing assembly having enhanced resistance to rolling contact fatigue.

A further object of the present invention is to provide a bearing assembly having enhanced wear resistance between contacting components.

A further object of the present invention is to provide a bearing assembly having enhanced durability.

Another object of the present invention is to provide a bearing assembly having enhanced performance.

A further object of the present invention is to provide a bearing assembly having a superhard polycrystalline superlattice coating that can be synthesized near room temperature to 700° F.

Another object of the present invention is to provide a bearing assembly having a superhard polycrystalline superlattice coating wherein the bearing assembly substrate can be many varieties of engineering substrates.

A further object of the present invention is to provide a bearing assembly having a superhard polycrystalline superlattice coating that can be manufactured at an industrial scale.

Another object of the present invention is to provide a bearing assembly having a superhard polycrystalline superlattice coating that follows the substrate surface topography.

A further object of the present invention is to provide a bearing assembly that includes advanced technology in surface coatings.

In accordance with the foregoing and other objects, the present invention is directed to a bearing assembly having a coating comprising a superhard polycrystalline superlattice material on one or more surfaces thereof. The bearing assembly includes a first race having a first load supporting surface and a second race disposed in a spaced relation with the first race, wherein the second race has a second load supporting surface. The bearing assembly further includes a plurality of rolling elements disposed between the first race and the second race and sized for rolling movement between the first load supporting surface of the first race and the second load supporting surface of the second race. According to the present invention, at least one component of the bearing assembly includes a coating located on at least a portion thereof. The coating includes at least one period of two or more layers of superhard polycrystalline superlattice material. The bearing assembly having this coating is operable for enhanced durability.

BRIEF DESCRIPTION OF THE DRAWINGS

A complete understanding of the invention may be obtained from the detailed description which follows, together with the accompanying drawings, wherein:

FIG. 6 is a graph of RCF life test results for specimens of uncoated and superlattice coated M-50 steel, as described in Example 1.

DETAILED DESCRIPTION OF THE PREFERRED EMBODIMENT

It should be understood that while this invention is described in connection with particular examples thereof, the scope of the invention need not be so limited. Rather, those skilled in the art will appreciate that the following teachings can be used in a wider variety of applications than the examples specifically mentioned herein.

The present invention provides a bearing assembly wherein at least one of its surfaces includes a superlattice-type protective composite coating. The composite coating comprises a plurality of polycrystalline layers of different adjacent compositions formed upon the bearing base material in a lamellar manner. The coating is disposed in a repetitive sequential multiple-period arrangement, wherein each period includes the same sequence of two or more individual layers of different adjacent superhard polycrystalline compositions. For purposes of explanation, some of the varieties of coated bearing assemblies contemplated by the present invention will be explained below first. The detailed explanation of bearing surfaces included in the various assemblies discussed below is important toward an understanding of the alternative bearing surface selections that may include the coatings discussed herein.

Figure 1:
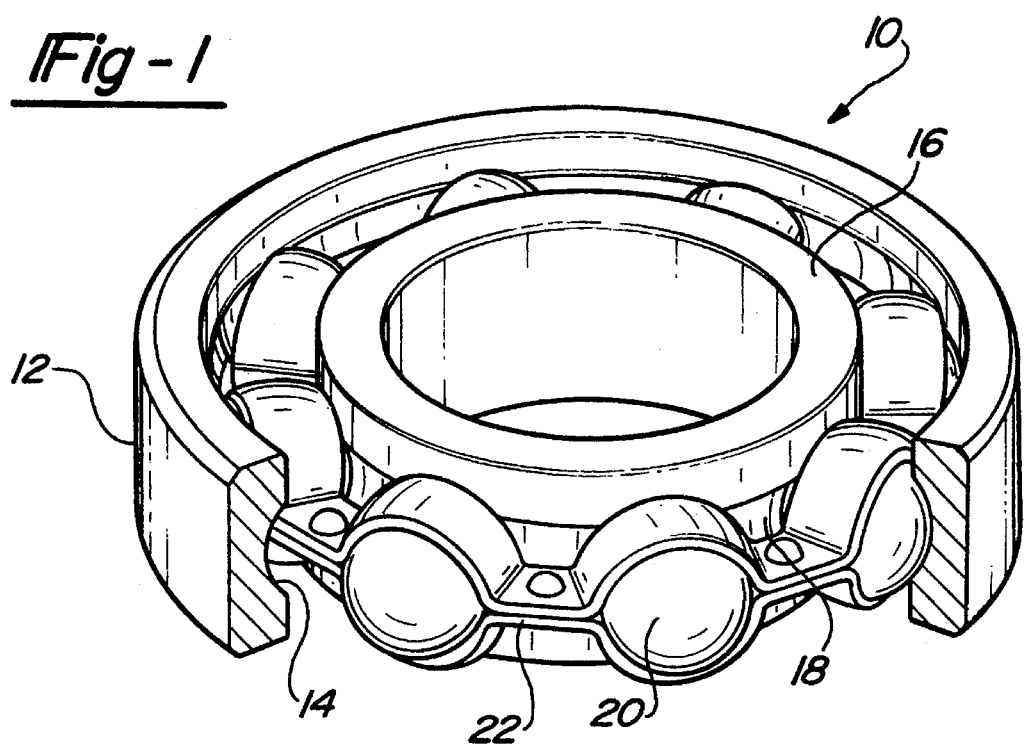
FIG. 1 is a partial cutaway perspective view of a deep groove ball bearing assembly of the present invention.

Referring now to FIG. 1, a bearing assembly is shown which is generally designated by the reference numeral 10. The bearing assembly 10 is of a variety generally known to those skilled in the art as a deep groove ball bearing assembly. A deep groove ball bearing assembly is one of several types of coated bearing assemblies contemplated by the present invention. The bearing assembly 10 is shown to include an outer race 12, which may preferably be of a ring-shaped configuration. The outer race 12 is shown to include an inner load supporting surface 14. The bearing assembly 10 is further shown to include an inner race 16, which may also be of a generally ring-shaped configuration. The inner race 16 is preferably disposed in a concentrically spaced relation within the outer race 12. The inner race 16 includes an outer load supporting surface 18.

The bearing assembly 10 further includes a rolling element assembly disposed between the outer race 12 and the inner race 16. As shown in FIG. 1, this includes a plurality of balls 20, which, in this type of bearing assembly, are of a spherical configuration. The rolling elements, such as the balls 20, are typically sized for rolling movement between the inner load supporting surface 14 of the outer race 12 and the outer load supporting surface 18 of the inner race 16. As such, the rolling elements provide means for accomplishing a relative rotational movement between the outer race 12 and the inner race 16. The bearing assembly 10 may further include means for maintaining a predetermined relative position of the rolling elements, as part of the rolling element assembly. This may be provided, as shown in FIG. 1, as a cage 22. The cage 22 is at least in part shaped complementary to the shape of the rolling elements, to allow freedom of motion. In this arrangement, where the rolling elements are spherical, the cage 22 is at least in part of a generally corresponding configuration. As such, the cage 22 is operable for maintaining a spaced relation between the balls 20, while allowing them to rotate freely between the outer race 12 and the inner race 16.

Figure 2:
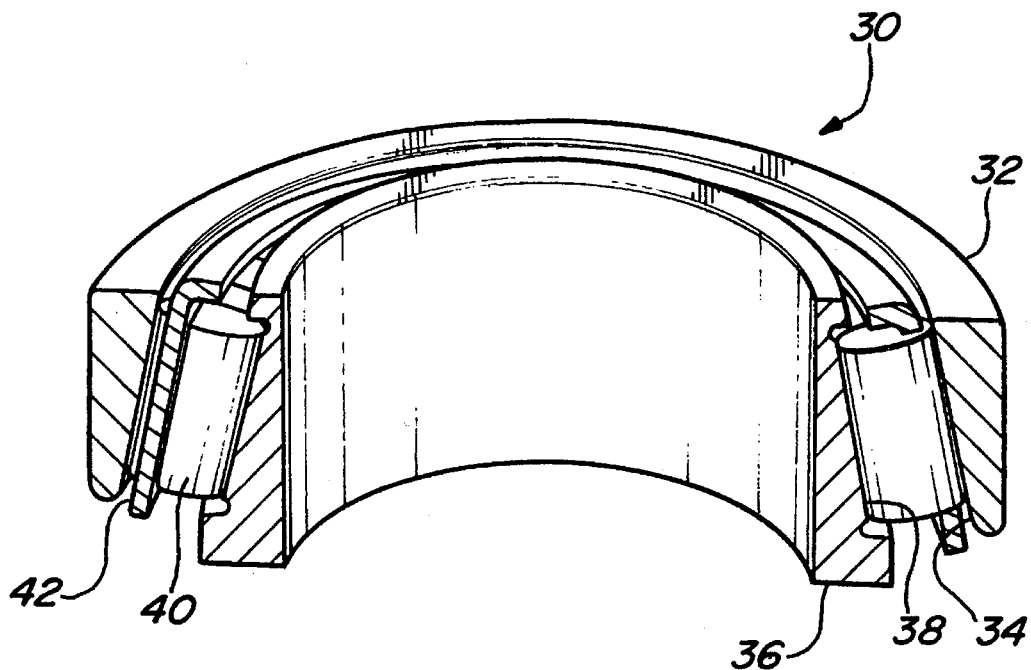
FIG. 2 is a partial cutaway perspective view of a tapered roller bearing assembly of the present invention.

Referring now to FIG. 2, another type of bearing assembly is shown, at 30. The bearing assembly 30 is of the variety generally known to those skilled in the art as a tapered roller bearing. The bearing assembly 30 is shown to include an outer race 32, which is, at least in part, of a generally ring-shaped configuration. The outer race 32 includes an inner load supporting surface 34, which in a tapered roller bearing assembly, is in a slanted configuration with respect to the remainder of the outer race 32. The bearing assembly 30 is also shown to include an inner race 36, which is also, at least in part, of a generally ring-shaped configuration. The inner race 36 includes an outer load supporting surface 38, which is similarly in a slanted configuration with respect to the remainder of the inner race 36. The inner race 36 is preferably disposed in a concentrically spaced relation within the outer race 32.

The bearing assembly 30 is shown to include a rolling element assembly disposed between the outer race 32 and inner race 36. In the tapered roller bearing assembly, shown at 30, this includes a plurality of cylindrically-shaped rollers 40 which are sized for rolling movement between the inner load supporting surface 34 of the outer race 32 and the outer load supporting surface 38 of the inner race 36. The rollers 40 are oriented in a slanted position corresponding to the slant of the inner load supporting surface 34 and the outer load supporting surface 38. As such, the rolling elements provide means for accomplishing a relative rotational movement between the outer race 32 and the inner race 36. The bearing assembly 30 may further include means for maintaining a predetermined relative position of the rolling elements, as part of the rolling element assembly. This may be provided, as shown in FIG. 2, as a cage 42. The cage 42 preferably includes a plurality of apertures through which the rolling elements can contact the outer race 32.

Figure 3:
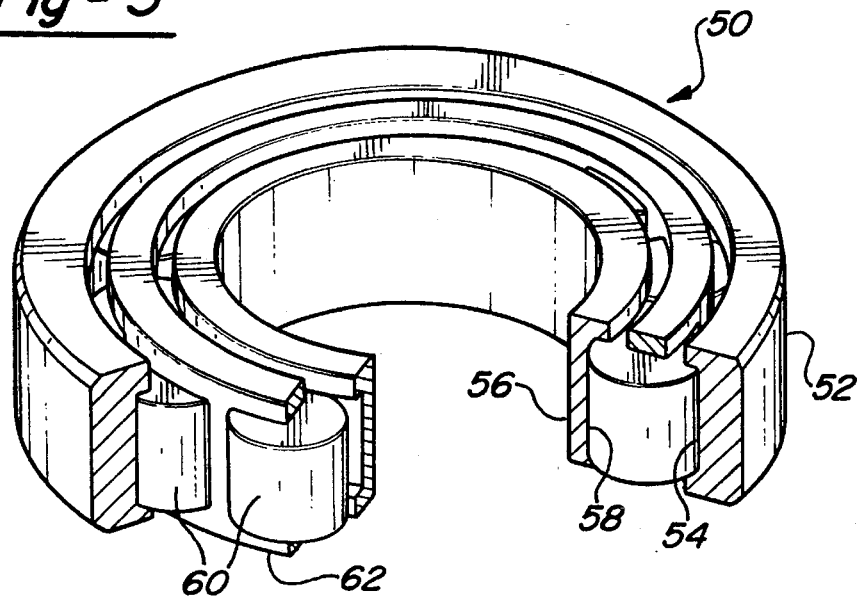
FIG. 3 is a partial cutaway perspective view of a cylindrical roller bearing assembly of the present invention.

Referring now to FIG. 3, there is shown another variety of bearing assembly that can be in coated form according to the present invention. FIG. 3 shows a bearing assembly 50, which is of the variety generally known to those skilled in the art as a cylindrical roller bearing. The bearing assembly 50 is shown to include an outer race 52, which is of a generally ring-shaped configuration. The outer race 52 includes an inner load supporting surface 54, which is preferably a rectangular indentation into the outer race 52. The bearing assembly 50 further includes an inner race 56, which is of a generally ring-shaped configuration. The inner race 56 is preferably disposed in a concentrically spaced relation within the outer race 52, in similar manner as before. The inner race 56 is further shown to include an outer load supporting surface 58, which is preferably configured as a rectangular indentation into the inner race 56. The bearing assembly 50 also includes a rolling element assembly disposed between the outer race 52 and inner race 56. In the cylindrical roller bearing assembly, shown at 50, this includes a plurality of cylindrically-shaped rollers 60 which are sized for rolling movement between the inner load supporting surface 54 of the outer race 52 and the outer load supporting surface 58 of the inner race 56. As such, the rolling elements provide means for accomplishing a relative rotational movement between the outer race 52 and the inner race 56. The bearing assembly 50 also includes means for maintaining the rollers 60 in a predetermined spaced relation from each other, as part of the rolling element assembly. This is provided as a cage 62, which, in FIG. 3, is shown to be of a generally cylindrical configuration, and spaced concentrically between the outer race 52 and the inner race 56. The cage 62 is further shown to include a plurality of rectangular apertures for allowing the rollers 60 to contact the outer race 52 and the inner race 56.

The examples of bearing assemblies shown in FIGS. 1–3 and described above are exemplary of the types of bearing assemblies which may be coated according to the present invention. It will be understood, however, that the present invention also contemplates other varieties of bearing assemblies, such as thrust bearings, coated according to the present invention. Further, it will be recognized that any of the above bearing assemblies may have configurations that depart from the description set forth.

According to the present invention, one or more surfaces of any of the bearing assemblies described herein are coated with one or more protective composite superhard surface coatings. The advantages of the coated surfaces may be realized in several arrangements, all of which are intended to be part of the present invention. For example, the load supporting surfaces of the bearing components are the primary focus for the application of performance-enhancing and durability-enhancing coatings. This is because these surfaces are the locations within bearing assemblies where most of the wear and performance shortcomings are experienced. Therefore, one aspect of the present invention includes bearing assemblies that are coated on load supporting surfaces with the surface coatings that will be described further below.

The load supporting surfaces may typically include the inner load supporting surfaces of outer races, the outer load supporting surfaces of inner races, rolling element surfaces that contact load supporting surfaces on adjacent races and contact surfaces upon means used to maintain predetermined relative positions and/or spacing between rolling elements, such as the interior surfaces of cages. Other surfaces of bearing assemblies may also importantly include such coatings, where corrosion or other chemical exposure may occur, or where physical, chemical or other interaction with other adjacent surfaces or environments may occur. Thus, it is contemplated by the present invention that these surface coatings can be included in a bearing assembly at any locations where a beneficial effect can result. In an alternative aspect of the present invention, all surfaces of the bearing assemblies are coated with these surface coatings, for one of several reasons. Such reasons include economy of production and additional benefits realized by coating non-load bearing surfaces, such as resistance to chemical interaction.

The most effective wear resistance is typically imparted where all bearing assembly surfaces, such as an outer race, an inner race and a roller element are coated with the coatings set forth herein. The most significant improvement in wear resistance involving the coating of only a portion of the bearing assembly has occurred where the inner race has been coated.

Figure 4:
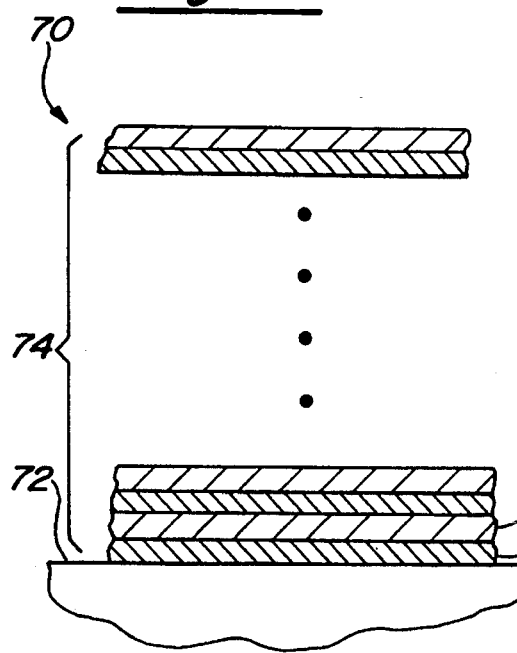
FIG. 4 is an exploded cross-sectional view of a bearing assembly surface with a coating formed thereupon, according to the present invention.

The more detailed aspects of the bearing surface coatings will now be described with reference to FIGS. 4 and 5. Referring now to FIG. 4, there is shown an enlarged exploded cross-sectional view of a bearing assembly surface, generally at 70. The bearing assembly surface 70 is shown to include a substrate 72, which may be the base material representing any of the bearing assembly components described above. For example, the substrate 72 may be the base material for an inner race, an outer race, a rolling element, means for maintaining a predetermined spaced relationship between rolling elements or any other bearing assembly component. The base material may be any suitable engineering material from which bearing assembly components are made. Such materials include various metals, metal alloys, composites and ceramic materials such as high strength standard and non-standard bearing steels and stainless steels. Specific examples of suitable base materials include polycrystalline M-50 steel, SKH4A bearing material, carburizing grades AISI 4118, AISI 8620, AISI 9310 and similar grades, hardened bearing steel such as AISI 52100 and AISI 440C stainless steel and silicon nitride ceramics. It will be appreciated, however, that any suitable base material may be used. Often, harder base materials are superior in terms of durability and performance. The coated bearing assemblies of the present invention show enhanced physical characteristics for these base materials. However, the present invention is also intended to encompass coated bearing assemblies formed using other base materials that are not the hardest base materials achievable, where such base materials are advantageously used due to cost or other considerations. Thus, coated bearing assemblies including these other base materials also show enhanced physical characteristics for these other base materials.

The bearing assembly surface 70 is shown to include a superlattice-type polycrystalline composite coating 74 having advantageous mechanical properties. The coating 74 comprises a plurality of different superhard polycrystalline compositions formed in an alternating or repetitive sequence layered arrangement upon the bearing base material in a lamellar manner. In a preferred arrangement, shown in FIG. 4, the coating 74 is a repetitive series of two alternating layers, located sequentially atop each other beginning from the substrate 72. The two layers are shown as a first material layer 76 and second material layer 78, disposed in alternating fashion atop the substrate 72 to form what is called a period ($\Lambda$), represented by the numeral 80. The coating 74 thus comprises of a plurality of periods 80, which can be formed in any desired number of layers N atop the substrate 72. Although it is preferred that each repetitive sequence of layers, such as the first material layer 76 and the second material layer 78, be substantially identical, other sequences can be used. In some arrangements, it may also be desirable to dispose one or more additional sequences of layers atop a first sequence of layers. Such an arrangement may include advantages of the properties of each sequence being used.

A reverse layer arrangement for the individual layers described above may also be suitable for taking advantage of the properties of these coatings. As shown in FIG. 5, a bearing assembly surface 70 includes a plurality of coating layers disposed atop a substrate 72, in similar manner as before. In this arrangement, however, the first material layer 76 and the second material layer 78 are reversed with respect to their position relative to the substrate 72. Further, the arrangement of all periods 80 is reversed compared to the arrangement set forth in FIG. 4.

In a preferred arrangement, the composite coating is a plurality of sequential vapor deposited coating layers. More specifically, the individual coating layers are preferably applied through reactive sputter deposition methods and using equipment well known to those skilled in the art. These methods are operable to control the thicknesses of individual layers as desired. Alternatively, the bearing assembly coatings of the present invention can be formed through other vapor deposition methods such as cathodic arc, evaporation, ion plating and plasma enhanced chemical vapor deposition. Each layer may also preferably be ion bombarded to an extent that the individual layers are substantially free of intragranular voids without adversely affecting the compositional modulation of the superlattice layers.

The polycrystalline superlattice layers are formed by vapor depositing upon a substrate under conditions that preserve the mechanical properties of the bearing assembly base material. For example, the layers are applied at temperatures where heat treated (e.g. tempered or precipitation hardened) steel substrates are allowed to substantially retain the properties achieved through heat treatment. Steel substrates can be coated with the polycrystalline superlattice layers of the present invention at temperatures under 500° C., and typically from about 150° C. to about 400° C. Further, certain steel microstructures, such as hard, quenched martensitic microstructures, can be retained under these processing conditions.

The layers of the coating 74 may be formed in a substantially planar configuration, or may alternatively be formed with non-planar interlayer interfaces and still exhibit the advantages described herein. The interfaces between adjacent layers may in fact be highly non-planar, such as bowed, and still provide the advantages to the bearing assembly discussed herein. Further, the interfaces between adjacent coating layers can exhibit substantial roughness, such as that due to layer intermixing during deposition, yet still achieve the advantages described herein. As such, adjacent layers may have a surface roughness greater than ±1 monolayer.

The selections for the first material layer 76 and the second material layer 78 include ceramics, metals, alloys, nitrides, borides, carbides and oxides of transition metals, other metals and alloys, carbon, such as diamond, and combinations thereof, such as carbonitride and oxynitride, as well as any suitable combination of any of the materials set forth above. Other suitable selections for the first material layer 76 and the second material layer 78 include ceramics. The ceramic layer may be selected from the group consisting of a nitride layer, a carbide layer, and oxide layer a boride layer and combinations thereof. In alternative arrangements where one, or more than one, repetitive sequences of more than two composition layers is used, it will be appreciated that the present invention contemplates any suitable combination of these materials and arrangement of layers. It will further be appreciated that different combinations of materials, sequences and thicknesses may affect different physical properties and characteristics of the bearing assembly coatings differently. Therefore, it will be realized that the selections for materials, sequences and thicknesses, and combinations of these within a coating can be altered to the advantage of one or more properties or characteristics deemed most important.

Figure 5:
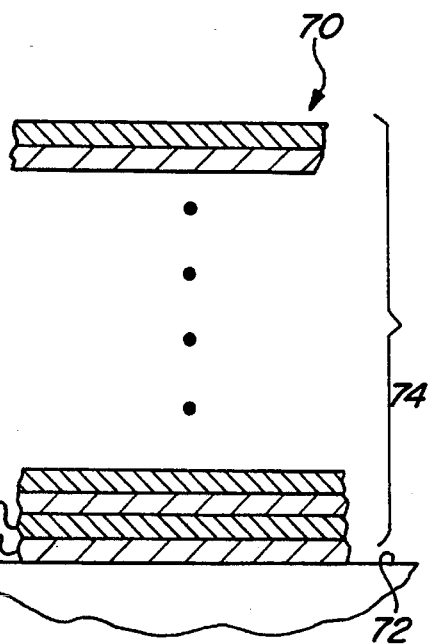
FIG. 5 is an exploded cross-sectional view of a bearing assembly surface with an alternate version of coating formed thereupon, according to the present invention.

In a preferred embodiment, the first material layer 76, shown in FIGS. 4 and 5, is titanium nitride (TIN). The second material layer 78 is preferably niobium nitride (NbN). As previously mentioned, the benefits of these layer selections may be realized with either material chosen as the beginning of the two-layer period. Therefore, a preferred bearing assembly of the present invention includes a substrate 72 constructed of the materials discussed above, with a superlattice coating 74 that is a titanium nitride/niobium nitride (TiN/NbN) superlattice coating. Another preferred bearing assembly of the present invention includes a substrate 72 constructed of the materials discussed above, with a superlattice coating 74 that includes a carbon nitride ($CN_x$) layer, (which the inventor believes may possibly be in the form of crystalline $C_3N_4$) as one of the layers. One example of such a coating is a titanium nitride/carbon nitride (TiN/$CN_x$) superlattice coating. Examples of suitable alternative embodiments for the coating 74 include a titanium nitride/nickel (TiN/Ni) superlattice coating, a nickel-chrome/titanium nitride (NiCr/TiN) superlattice coating, and other combinations of the above selections. Coatings having a specific selection for one of the layers may provide certain identifiable advantages. For example, coatings having chromium nitride (CrN) as one of the layer selections provide increased resistance against corrosion and chemical interaction. It will be appreciated that the coatings set forth herein are offered for purposes of illustration and not limitation.

The preparation of crystalline carbon nitride ($\beta$—$C_3N_4$) has been attempted previously for use as a surface coating for industrial equipment, but has not been successful. Bearing assemblies having a superlattice coating including a carbon nitride ($CN_x$) layer, (which may possibly be in the form of crystalline $C_3N_4$) are part of the present invention, however. It has been theorized that crystalline carbon nitride ($\beta$—$C_3N_4$) is metastable and that, therefore, a structural template may be required to seed the growth of crystalline carbon nitride. This is accomplished by delivering carbon and nitrogen species to substrate surfaces that bear a structural relationship to crystalline carbon nitride. It has been discovered that a surface of TiN, due to its hexagonal symmetry, facilitates the formation of crystalline carbon nitride, having the same hexagonal symmetry. This occurs much in the same way that cubic TiN layers force NbN and CrN to adopt the same cubic structure under growth conditions where the formation of hexagonal phases of NbN and CrN should have been favored. At the carbon nitride/TiN interface, the formation of TiC or TiCN phases is possible, however. The formation of TiC causes the reduction of lattice mismatch, resulting in a lattice strain that causes elastic strain energy to build with increasing coating thickness. Because at some point, the formation of crystalline carbon nitride no longer becomes favorable, a simple periodic replenishment of TiN seed layers, through the superlattice layering employed in the bearing coatings herein, is a convenient method for continuing crystalline carbon nitride formation.

The thicknesses of the individual superlattice coating layers, namely, the first material layer 76 and the second material layer 78, are factors influential of mechanical properties resulting in enhanced RCF life. The thicknesses of these layers may vary and are dependent upon the type of bearing assembly being coated, the composition of each bearing material, the size of the bearing assembly being coated, and the wear resistance, physical strength, hardness or other physical characteristic being imparted to the bearing assembly. Whereas with other types of industrial equipment, such as machine tools, thicker coatings are generally used, it has been found generally advantageous to use thinner coatings in bearing applications. It should be noted that each sequential layer within a particular superlattice coating can be, but is not necessarily, of the same thickness. Thus, while it is desirable to obtain a bearing whose surface includes a layered coating structure, uniform layering is usually not achieved with current layering methods.

Typical thicknesses for coatings may vary from thin films of thicknesses on the order of several atomic diameters of carbon to films of thickness from a few millionths of an inch to several thousandths of an inch or more. The individual layers forming the superlattice coatings described herein typically are of a thickness less than about 150 nm (0.15 microns). This corresponds to a thickness for a two-layer superlattice period ($\Lambda$), represented by the numeral 80 in FIGS. 4 and 5, of less than 300 nm (0.3 microns). Preferably, the individual layers are of a thickness of from about 1 nm to about 75 nm, corresponding to a two-layer period thickness of from about 2 nm to about 150 nm. More preferably, the individual layer thickness is from about 1.5 nm to about 10 nm, corresponding to a two-layer period thickness of from about 3 nm to about 20 nm. Most preferably, the individual layer thickness is from about 1.5 nm to about 3 nm, corresponding to a two-layer period thickness of from about 3 nm to about 6 nm. In one test of a TiN/NbN superlattice coating, the most favorable results have been found at a two-layer period thickness of about 3 nm.

It will be appreciated, however, that the individual layer thicknesses will vary with the compositions of the superlattice layers being used, the total number of layers, the substrate composition and the physical requirements for the bearing assembly. Thus, bearing assemblies of the present invention may include coatings having any suitable layer thicknesses. Further, the layer thicknesses may be, but are not required to be, uniform. The overall or total thickness of the composite bearing assembly coating formed by the superlattice layers is preferably from about 0.05 to about 20 microns. More preferably, the overall coating thickness is from about 0.1 to about 4 microns. Most preferably, the overall coating thickness is about 0.5 microns (500 nm). It has been determined that the thickness of individual coating layers and of periods of these layers, as well as the deposition conditions are all factors influential of the RCF life of the coated bearing assembly.

The present invention utilizes the principle that coatings of these superlattice layers collectively have a hardness greater than that of any individual layer material of any thickness, and in any form. The multi-layer coatings should be harder than individual coatings because the hardness is enhanced due to dislocation blocking from the lattice mismatch strains between the individual layers. Bearing assemblies including the superlattice coatings described herein are harder than diamond-like carbon or synthetic diamond coatings, with hardness ranging from about 20 GPa to about 60 GPa. Bearing assemblies including the carbon nitride superlattice coatings described herein exhibit nanoindentation hardnesses in the range of from about 45 GPa to about 55 GPa. Bearing assemblies including the titanium nitride/niobium nitride superlattice coatings described herein exhibit nanoindentation hardnesses of from about 30 GPa to about 40 GPa.

In addition to the hardness benefits, bearings having these superlattice coatings can also exhibit corrosion protection and protection from other chemical interaction on the coated surfaces, as compared to uncoated bearing steels. The extent of corrosion protection is dependent on the materials from which the superlattice coating is made.

In accordance with the present invention, bearing assemblies may be coated on all load supporting surfaces, or may alternatively be coated on selected load supporting surfaces only. One optional arrangement for bearing assemblies of the present invention includes coatings of the type discussed herein disposed only upon one, several or all load supporting surfaces. Limiting the use of coatings may be beneficial in terms of ease and cost of production. In this regard, bearing assemblies coated on only one load supporting surface have exhibited the most favorable results when the outer load supporting surface of the inner race is the single surface selected for coating. It therefore appears that the outer load supporting surface of the inner race is a highly beneficial surface for these coatings, where limited use of coatings occurs.

Another optional arrangement involves bearing assemblies coated only on contact surfaces and selected adjacent surfaces. The production of bearing assemblies having surface coatings only on selected surfaces may also be advantageous toward decreasing cost. The vapor deposition method of applying these coatings to bearing assembly components typically requires that either each component or the vapor deposition apparatus be manipulated during the process. A reduction in the surface area upon which a coating is to be applied will result in a reduction of time and manipulation required to complete the coating application. In addition, a savings in the total amount of coating material used will be accomplished where a bearing assembly includes a coating only on contact surfaces where a decrease in wear is desired. In some environments, however, such as where a bearing assembly is likely to experience corrosion or other chemical attack, total surface coverage may be desirable.

Another option contemplated by the present invention is the use of hybrid bearing assembly components. This option is possible when certain bearing components can be made of a material having high durability, but others can not practically be made of the same material. For example, when superlattice coated races with ceramic balls (a hybrid bearing) are used in high speed bearing applications, the bearing races still exhibit greater wear.

The bearing assemblies having coatings according to the present invention have several distinct advantages. One advantage is improved hardness realized by the combination of sufficiently thin individual coating layers with distinctly different compositions at locations proximate the several layer interfaces. The coatings described herein exhibit a net surface hardness that exceeds that achieved by any individual layer, regardless of thickness. Other advantages include bearing assemblies having enhanced corrosion resistance, resistance to other chemical interaction, enhanced coefficient of friction and enhanced adherence, all of which can contribute to improved RCF life. It has also been determined that increased hardness is correlated with larger compressive residual stress, which is beneficial for the reasons described above. Further, the bearing assemblies described herein can be produced in industrial quantities, and can be made very smooth without post-processing. It has also been determined that surface roughness is generally lessened for smoother substrates. The enhanced bearing life obtained by using a coated bearing can also allow smaller bearings to be used in applications where weight reduction is an issue.

The following are examples of coated bearing assemblies according to the present invention. These are provided for purposes of illustrating, not limiting, the present invention.

EXAMPLE 1

Multiple bar specimens of M-50 steel were vapor deposited with a superlattice surface coating of titanium nitride/niobium nitride (TiN/NbN) in accordance with the present invention. The deposition conditions were as follows:

Power: 5 kW at each target (Ti and Nb)
Total argon+nitrogen pressure: 8 mTorr
Nitrogen partial pressure: 0.15–0.20 mTorr
Pulsed DC biased voltage: −130 volts
Lattice Period: 3–6 nm The specimens were rotated in front of the targets to obtain a superlattice coating having a period of from about 3 nm to about 6 nm. The coating structure was produced in alternating layers of TiN and NbN. The total coating thickness was about 0.5 microns (500 nm). The specimens were then subjected to RCF tests at 500 ksi contact stress. The RCF test used is described in detail in ASTM Special Technical Publication 771. The RCF test life of the specimen deposited with a coating period of 3 nm was improved about 16 times with the coating, as compared to uncoated M-50 specimens. The results of this test are shown graphically in FIG. 6.

EXAMPLE 2

The titanium nitride/niobium nitride superlattice coatings set forth in Example 1 is applied to a bearing assembly according to the present invention made from SKH4A material. The bearing assembly is coated on the inner and outer raceways, and includes uncoated balls. The bearings are run under no lubrication and under vacuum conditions. A dust test is performed on the assembly to determine the amount of debris or dust created during the running of the bearing. Under test conditions at a force of 1 kgf and a speed of 50 rpm, the coating does not flake off.

EXAMPLE 3

A titanium nitride/carbon nitride (TiN/CN$_x$) coating is disposed upon M-50 RCF rods. The rods were coated under the following conditions:

Target Power: 5/4.5 KW (Ti target/C target)
Total argon+nitrogen pressure: 8 mTorr
Nitrogen partial pressure: 0.17 mTorr
Pulsed DC biased voltage: −100 volts
Lattice Period: 4 nm Presently this coating is being tested in similar manner as is described in Example 1. Early test results show excellent adherence of the coating on test bars after testing. (There is insufficient life data at this time.)

It will be appreciated that the description set forth herein applies to any individual component of a bearing assembly, including one or more rolling elements, an outer race, an inner race and a support structure for one or more rolling elements. It will also be appreciated that the description set forth herein applies to any individual component of a bearing-shaft assembly, including a shaft, a race, one or more rolling elements and a support structure for one or more rolling elements. It will be further appreciated that the coating compositions described herein may also be useful as coatings for other types of industrial equipment besides bearing assemblies.

What is claimed is:

1. A rolling element bearing assembly comprising:
   a first race having a first load supporting surface;
   a second race disposed in a spaced relation with said first race, said second race having a second load supporting surface; and
   a rolling element assembly disposed in contact with said first race and said second race and sized for rolling movement between said first load supporting surface of said first race and said second load supporting surface of said second race;
   wherein at least one component selected from the group consisting of said first race, said second race and said rolling element assembly includes a coating located on at least a portion thereof;

said coating comprising a plurality of polycrystalline layers disposed in a repetitive sequence forming a superlattice structure, said sequence including at least two adjacently disposed layers of different composition;

said coating being operable to enhance the rolling contact fatigue life of said bearing assembly.

2. The bearing assembly according to claim 1 wherein said composition layers are selected from the group consisting of ceramics, metals, alloys, nitrides, borides, carbides and oxides of metals and alloys, carbon, and combinations thereof.

3. The bearing assembly according to claim 1 wherein said composition layers are selected from the group consisting of titanium nitride and niobium nitride.

4. The bearing assembly according to claim 1 wherein said composition layers are selected from the group consisting of titanium nitride and carbon nitride.

5. The bearing assembly according to claim 1 wherein the thickness of each coating layer is less than about 150 nm.

6. The bearing assembly according to claim 1 wherein the thickness of each period within said coating is less than 300 nm.

7. The bearing assembly according to claim 1 wherein the thickness of each coating layer is from about 1 nm to about 75 nm.

8. The bearing assembly according to claim 1 wherein the thickness of each period within said coating is from about 2 nm to about 150 nm.

9. The bearing assembly according to claim 1 wherein the thickness of each coating layer is from about 1.5 nm to about 10 nm.

10. The bearing assembly according to claim 1 wherein the thickness of each period within said coating is from about 3 nm to about 20 nm.

11. The bearing assembly according to claim 1 wherein the thickness of each coating layer is from about 1.5 nm to about 3 nm.

12. The bearing assembly according to claim 1 wherein the thickness of each period within said coating is from about 3 nm to about 6 nm.

13. The bearing assembly according to claim 1 wherein the thickness of each period within said coating is about 3 nm.

14. The bearing assembly according to claim 1 wherein the overall thickness of said coating is from about 0.05 to about 20 microns.

15. The bearing assembly according to claim 1 wherein the overall thickness of said coating is from about 0.1 to about 4 microns.

16. The bearing assembly according to claim 1 wherein the overall thickness of said coating is about 0.5 microns.

17. The bearing assembly according to claim 1 wherein said coating has a nanoindentation hardness of from about 20 GPa to about 60 GPa.

18. The bearing assembly according to claim 1 wherein said coating has a nanoindentation hardness of from about 30 GPa to about 55 GPa.

19. The bearing assembly according to claim 1 wherein at least one component selected from the group consisting of said first race, said second race and said rolling elements is constructed from a material selected from the group consisting of metals, metal alloys, composites and ceramics.

20. The bearing assembly according to claim 1 wherein said coating is selected from the group consisting of a titanium nitride/nickel (TiN/Ni) superlattice coating and a nickel-chrome/titanium nitride (NiCr/TiN) superlattice coating.

21. A rolling element bearing assembly comprising:

a ring-shaped first race having a first load supporting surface;

a ring-shaped second race disposed in a spaced relation with said first race, said second race having a second load supporting surface; and a rolling element assembly disposed in contact with said first race and said second race and sized for rolling movement between said first load supporting surface of said first race and said second load supporting surface of said second race;

wherein at least one component selected from the group consisting of said first race, said second race and said rolling element assembly includes a coating located on at least a portion thereof;

said coating comprising a plurality of polycrystalline layers disposed in a repetitive sequence forming a superlattice structure, said sequence including at least two adjacently disposed layers of titanium nitride and niobium nitride;

said coating being operable to enhance the rolling contact fatigue life of said bearing assembly.

22. A rolling element bearing assembly comprising:

a ring-shaped first race having a first load supporting surface;

a ring-shaped second race disposed in a spaced relation with said first race, said second race having a second load supporting surface; and a rolling element assembly disposed in contact with said first race and said second race and sized for rolling movement between said first load supporting surface of said first race and said second load supporting surface of said second race;

wherein at least one component selected from the group consisting of said first race, said second race and said rolling element assembly includes a coating located on at least a portion thereof;

said coating comprising a plurality of polycrystalline layers disposed in a repetitive sequence forming a superlattice structure, said sequence including at least two adjacently disposed layers of titanium nitride and carbon nitride;

said coating being operable to enhance the rolling contact fatigue life of said bearing assembly.

* * * * *